Aug. 22, 1961     R. DEBESSON     2,997,091
PNEUMATIC TYRES
Filed June 23, 1959

INVENTOR
Robert Debesson
by Benj. T. Rauber
his attorney

United States Patent Office 2,997,091
Patented Aug. 22, 1961

2,997,091
PNEUMATIC TYRES
Robert Debesson, Montlucon, France, assignor to Dunlop Rubber Company Limited, London, England, a British company
Filed June 23, 1959, Ser. No. 822,347
Claims priority, application France July 1, 1958
11 Claims. (Cl. 152—354)

This invention relates to pneumatic tyres and more particularly to bead reinforcements for pneumatic tyres.

The conventional bead reinforcement for a pneumatic tyre comprises a plurality of inextensible wires, generally of steel, in the form of a ring disposed coaxially with the axis of the tyre. The region containing the bead wires is usually provided with an additional reinforcement, known as the filler, which extends from the bead wires into the lower portion of the sidewall.

The conventional types of bead reinforcements described above have the disadvantage that the bead is much stiffer than the filler and the filler is much stiffer than the carcass sidewall reinforcement. The sudden change of stiffness between the reinforcements is disadvantageous and can be the cause of tyre failure.

The present invention provides a pneumatic tyre, in which the stiffness of the tyre is reduced progressively from the bead region to the sidewall.

According to the invention a pneumatic tyre comprises in each bead region a reinforcement of a length or lengths of inextensible filamentary material, said length or lengths being substantially tangential, at a plurality of points distributed around the periphery of the bead region, to the base of the bead region and extending into the sidewall region of the tyre.

The reinforcement may consist of a plurality of separate length of inextensible filamentary material disposed tangentially to the base of the bead region and uniformly distributed around the periphery thereof. The lengths may be rectilinear as viewed from the side of the tyre or may be curved, having a curvature which may be concave or convex viewed from a position radially outside the tyre.

The reinforcement may alternatively comprise a continuous length of inextensible filamentary material wound about the periphery of the base of the bead region in the form of a plurality of successive convolutions, each convolution being tangential to the said periphery at at least one point of the said periphery, the points at which the convolutions are tangential to the said periphery being uniformly distributed around the said periphery.

The length or lengths constituting the reinforcement may be of metal or of other inextensible filamentary material, and may be in the form of a monofilament or of twisted or cabled groups of filaments as, for example, steel cords.

In the pneumatic tyre according to the invention, the reinforcement may extend into the sidewall of the tyre to a distance from the base of the bead region greater than a quarter of the height of the tyre section and up to a third of the said height.

The pneumatic tyre according to the invention may comprise a conventional carcass, or may have only a tread reinforcement, together with the bead reinforcement described above. More than one reinforcement may be provided in each bead region, or one or more reinforcements of the form described above may be associated with one or more conventional bead wires.

The invention will now be described with reference to the accompanying drawings, in which.

Figure 1:
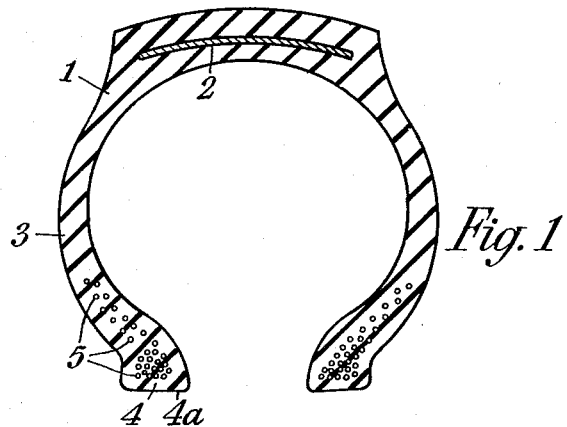
FIGURE 1 is an axial cross-section of a pneumatic tyre according to the invention.
Figure 2:
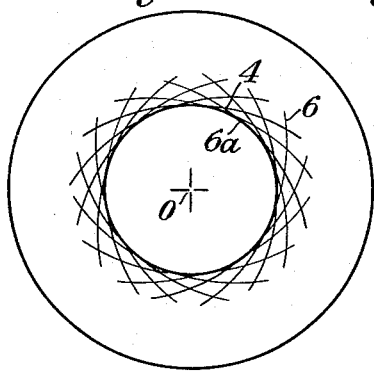
FIGURE 2 is a diagrammatic side view of a bead reinforcement comprising separate lengths of steel cord.

FIGURE 1 shows a pneumatic tyre 1 provided with a tread reinforcement 2, sidewalls 3 and bead regions 4. The bead regions 4 each contain a reinforcement 5 formed from steel cords 6, having a convex curvature viewed from a position radially outside the tyre, as shown in FIGURE 2. These cords are substantially tangential to the inner periphery 4a of the bead region 4 at points around the periphery thereof, e.g. 6a. The cords 6 are not strictly tangential but only substantially tangential by virtue of the thickness of rubber between the inner periphery 4a and the cords 6, as shown in FIGURE 1. The cords 6 each extend at both sides of the tangential point, e.g. 6a, into the sidewalls of the tyre for a radial distance equal to one third of the height of the tyre.

Figure 3:
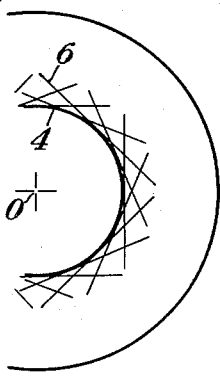
FIGURES 3 and 4 are diagrammatic part side views showing two alternative constructions of a bead reinforcement comprising separate lengths of steel cord.

In an alternative construction the cords 6 as shown in FIGURE 3 are rectilinear in form, otherwise the construction is similar to that shown in FIGURE 2.

Figure 4:
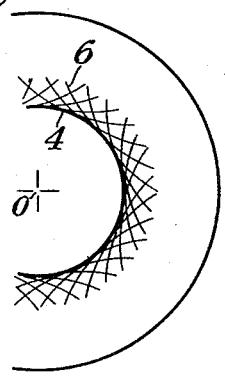

In a further alternative construction, shown in FIGURE 4, the cords 6 are curved oppositely as compared with the curvature of the cords of FIGURE 2, i.e., concave as viewed from a position radially outside the tyre.

Figure 5:
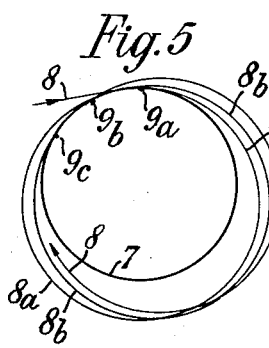
FIGURES 5 and 7 are diagrammatic side views which illustrate the formation of three alternative bead reinforcements which each comprise a single continuous length of steel cord.
Figure 6:
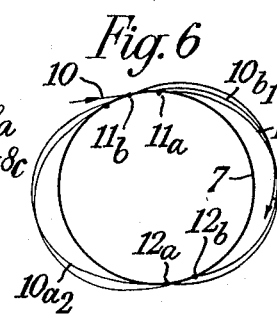
Figure 7:
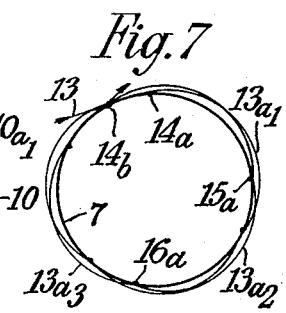

FIGURES 5 to 7 illustrate an alternative manner of construction of the bead reinforcement by winding a continuous steel cord around the periphery of the base of the bead region.

In FIGURE 5 the inner periphery of the bead region is represented by the circle 7, and in forming the reinforcement the continuous steel cord 8 passes first tangentially to the circle 7 at 9a then describes the convolution 8a and again passes tangentially to the circle 7 at 9b. The cord 8 then describes a second convolution 8b which again passes the circle tangentially, at 9c. A third convolution 8c is then formed and the winding continues until the tangential points 9a, 9b, 9c, etc., are uniformly distributed around the circle 7.

The convolutions 8a, 8b, 8c, etc., may be in the form of circles, eccentric with respect to the centre of the circle 7, or may have any other suitable configuration.

In the further alternative embodiment shown in FIGURE 6 the steel cord 10 describes convolutions each of which is tangential to two points on the periphery 7 of the bead region. The cord 10 passes the circle 7 tangentially at 11a, then describes a semi-circle 10a1 and again passes tangentially to the circle 7 at 12a; describes a second semi-circle 10a2 and again passes the circle 7 tangentially at 11b; describes a semi-circle 10b1 and passes the circle 7 tangentially at 12b. The winding continues until the tangential points 11a and 11b, 12a and 12b etc., are uniformly distributed around the circle 7.

In the further alternative construction shown in FIGURE 7 each of the convolutions described by the steel cord 13 is tangential to the circle 7 at three separate points. The cord 13 passes the circle 7 tangentially at 14a, describes a part of a convolution 13a1, passes the circle 7 tangentially at 15a, describes a second part of a convolution 13a2, passes the circle 7 tangentially at 16a, describes a third part of a convolution 13a3, and again passes the circle 7 tangentially at 14b to complete the first set of tangential points of the winding. The winding then continues in a similar manner, the tangential points 14a, 15a, 16a, 14b etc. being distributed uniformly around the circle 7.

It will be appreciated that other constructions may be obtained having any number of tangential points per convolution.

A tyre according to the invention may be produced by the assembly, on either a cylindrical building drum or a toroidally-shaped former, of the bead reinforcements described above into a conventional or a carcass-less tyre.

In the case of the manufacture of a pneumatic tyre which is assembled on a cylindrical former, the bead reinforcements shown in FIGURES 5 to 7 may be produced by winding a continuous steel cord in appropriate paths on tyre building material wrapped around the former, and subsequently shaping the completed tyre body to toroidal form and then moulding the tyre in a conventional tyre mould. To obtain the constructions shown in FIGURES 2 to 4 of the drawings each bead reinforcement is wound in the manner described from a continuous steel cord wound along an appropriate path. The looped edge which eventually forms the radially outermost edge of the reinforcement is severed to form the reinforcements as illustrated.

In the case of assembly on a toroidal former, the bead reinforcements are made separately, for instance by winding a steel cord in the appropriate configuration onto a rubber annulus carried on a flat surface. The rubber annulus and the winding are then applied to a partly assembled tyre mounted on the former. As in the case of assembly on a cylindrical drum, the continuous cord may be cut after winding to produce a reinforcement of the form shown in FIGURES 2 to 4 of the drawings.

Instead of using a single cord, continuous and closed rings of larger diameter than the inner periphery of the bead region may be used, the peripheries of the rings touching the inner periphery of the bead region at points uniformly distributed around the bead region.

The bead reinforcement in accordance with the invention consists of an integral unit reinforcement in contrast to the conventional construction of bead wire and separate filler reinforcement. By virtue of its integral construction and the gradual reduction of its stiffness from the inner periphery of the bead region towards the sidewall, the danger of failure of the tyre due to separation of the reinforcing elements from one another and from the surrounding rubber is reduced.

Having now described my invention, what I claim is:

1. A pneumatic tyre comprising in each bead region a reinforcement of lengths of inextensible filamentary material, said lengths being substantially tangential to the bead at a plurality of points distributed around the periphery of the bead region, and extending into the sidewall region only of the tyre.

2. A pneumatic tyre according to claim 1 wherein the reinforcement for each bead region comprises a plurality of separate curved filaments of inextensible material disposed substantially tangentially to the base of the bead and uniformly distributed around the periphery thereof.

3. A pneumatic tyre according to claim 2 wherein the curvature of the filaments is concave viewed from a radially outside the tyre.

4. A pneumatic tyre according to claim 2 wherein the curvature of the filaments is concave viewed from a position radially outside the tyre.

5. A pneumatic tyre comprising in each bead region a reinforcement comprising a continuous filament of inextensible material wound about the periphery of the base of the bead region in the form of a plurality of successive convolutions, each convolution being tangential to the said periphery at at least one point of the said periphery, the points at which all of the convolutions are tangential to the said periphery being substantially uniformly distributed around the said periphery.

6. A pneumatic tyre according to claim 5 wherein each convolution is tangential to the said periphery at one point only.

7. A pneumatic tyre according to claim 1 wherein the said reinforcement extends into the sidewall of the tyre to a distance from the base of the bead region within the limits of from a quarter to one third of the height of the tyre section.

8. A pneumatic tyre according to claim 1 in which the bead reinorcement forms part of a carcass of rubber reinforced throughout with filaments or cords.

9. A pneumatic tyre according to claim 1 wherein the said reinforcement forms the only reinforcement in the sidewall region of the tyre.

10. A pneumatic tyre according to claim 1 wherein the inextensible material is steel cord.

11. A pneumatic tyre according to claim 1 wherein the reinforcement for each bead region comprises a plurality of separate curved filaments of inextensible material disposed substantially tangentially to the base of the bead and uniformly distributed around the periphery thereof, wherein the filaments are rectilinear when viewed from the side of the tyre.

References Cited in the file of this patent

UNITED STATES PATENTS

| 784,166 | Large | Mar. 7, 1905 |
| 924,571 | Palmer | June 8, 1909 |